United States Patent

[11] 3,627,632

| [72] | Inventors | Heinz Acher<br>Friedberg, Hessin;<br>Eberhard Obenauf, Offenbach am Main,<br>both of Germany |
|---|---|---|
| [21] | Appl. No. | 778,457 |
| [22] | Filed | Nov. 25, 1968 |
| [45] | Patented | Dec. 14, 1971 |
| [73] | Assignee | Licentia Patent-Verwaltungs-G.m.b.H.<br>Frankfurt am Main, Germany |
| [32] | Priority | Nov. 24, 1967 |
| [33] | | Germany |
| [31] | | P 16 14 098.0 |

[54] HYDRAULIC DRIVE FOR EMERGENCY SHUTDOWN OF NUCLEAR REACTORS
15 Claims, 3 Drawing Figs.

| [52] | U.S. Cl. | 176/36 |
|---|---|---|
| [51] | Int. Cl. | G21c 7/16 |
| [50] | Field of Search | 176/33–36, 22, 86 |

[56] References Cited
UNITED STATES PATENTS

| 2,975,119 | 3/1961 | Emmons | 176/36 X |
| 3,031,397 | 4/1962 | Fortescue et al. | 176/36 X |

Primary Examiner—Benjamin R. Padgett
Assistant Examiner—Harvey E. Behrend
Attorney—Spencer & Kaye ABSTRACT: Hydraulic drive system for effecting the emergency shutdown by control rods of a nuclear reactor in which a guide housing is connected to the pressure vessel of the reactor. A control rod drive piston is movably mounted in a guide housing connected to the reactor. Such drive piston and guide housing together forming a drive chamber on one side of the drive piston and a counterpressure chamber on the other side thereof. The drive chamber is connected to a pressure medium chamber in the pressure vessel and to the counterpressure chamber such that, when the counterpressure chamber is opened to atmosphere, pressure medium flows from the pressure medium chamber into the drive chamber to move the drive piston; hence, the control rod connected thereto, rapidly into the emergency shutdown position.

3,627,632

HYDRAULIC DRIVE FOR EMERGENCY SHUTDOWN OF NUCLEAR REACTORS

BACKGROUND OF THE INVENTION

The present invention relates to a hydraulic drive system for the emergency shutdown of nuclear reactors by means of control rods. More particularly, the hydraulic drive system of the present invention provides a drive piston connected to a neutron-absorbing portion. The drive piston is mounted in a guide housing permanently attached to the reactor pressure vessel and is also connected to a means for making fine adjustments in the position of the neutron-absorbing portion. The drive piston forms a drive chamber and a counterpressure chamber together with the guide housing. The pressure medium flows successively through both such chambers via a gap provided between the guide housing and the drive piston while under reactor pressure.

For safety reasons it must be possible to move the neutron-absorbing portions of nuclear reactor control rods very rapidly into the reactor core in order to prevent the reactor from going out of control. Great speed is required in moving the neutron-absorbing portion to a shutdown position, particularly in fast steam-cooled reactors. If, for example, a pipe ruptures in the main steam line of such a reactor, a pressure medium loss is experienced by the system. This results in a heavy loss of pressure in the system. Thus, the control rod drive system must be activated very quickly in order for the reactor, in turn, to be effectively shut down in time.

A control rod drive system is known in which a mechanical and hydraulic drive act together on the neutron-absorbing portion of the control rod, as required. The transfer of power occurs via a mechanical means for adjusting the position of the control rod in the reactor. During emergency shutdowns the hydraulic drive is cut off in such a manner that pressure develops which acts on the mechanical means so that the neutron-absorbing portion of the control rod is immediately pushed into the reactor core. According to this drive system, however, the buildup of pressure requires a certain amount of time so that valuable time is lost in shutting down the reactor.

According to another known but unpublished approach a pressure reservoir is provided which acts directly on the end of the adjusting linkage of the drive, whereas a counterpressure chamber acting on the adjusting linkage in the opposite direction keeps it balanced, if both chambers should happen to be fed with reactor pressure. During emergency shutdowns a fast-closing valve opens the counterpressure chamber to the atmosphere so that the neutron-absorbing portion of the control rod is driven into the reactor core.

SUMMARY OF THE INVENTION

It is an object of the present invention to provide an improved hydraulic drive system for the emergency shutdown of nuclear reactors based on the latter, above-described approach.

This object is achieved by providing a control rod drive piston having a drive chamber on one side and a counterpressure chamber on its other side. The drive chamber is connected with a pressure medium chamber in the reactor pressure vessel via a relief valve and to the counterpressure chamber also. During emergency shutdowns, the counterpressure chamber is opened to atmospheric pressure and the relief valve is opened to let pressure medium flow from the reactor chamber into the drive chamber to drive the piston, hence the control rods, into the reactor core.

By a further aspect of the present invention, the pressure medium flowing into the drive chamber is taken from a collector chamber formed between the pressure medium chamber and the drive chamber by that portion of the guide housing near the reactor pressure vessel. Pressure medium used as a coolant is filled in a heat protection chamber disposed between the collector chamber and the outer wall of the guide housing. By thus providing a collector chamber, it is assured that the required amount of pressure medium will always flow into the drive chamber regardless of what happens within the reactor pressure vessel itself. For instance, in the extreme event of the guide housing breaking away from the reactor pressure vessel, the invention defines a system wherein the flow of pressure medium into the drive chamber will continue.

The pressure medium taken out of the counterpressure chamber is fed into the collector chamber and from there is conducted, via a conduit disposed between the drive piston and the guide housing, into the drive chamber. From the drive chamber, the pressure medium flows through a gap between the drive piston and the guide housing back into the counterpressure chamber. Thus, pressure equalization is achieved between the pressure medium chamber and the drive system so that sealing and heat problems are minimized.

In steam-cooled reactors, it is particularly advantageous to use water as the pressure medium in the control rod drive system. Water is fed into the collector chamber until it reaches a level above relief valves provided in the drive piston of the system. These piston relief valves serve to connect the collector chamber with the counterpressure chamber directly in the event a driving pressure is exerted against the drive piston and the counterpressure chamber is not sufficiently opened to the atmosphere.

In order to regulate the pressure, due to steam, in the pressure medium chamber in accordance with the requirements of the collector chamber, a drainage pump is connected approximately at the end of the collector chamber in the direction toward the pressure medium chamber.

The drive piston is connected to a setting drive or means for making fine adjustments in the position of the neutron-absorbing portion of the control rod by latch elements which can be influenced by pressure in the drive chamber in such a manner that the latch elements, which are coupled to each other, are decoupled when the drive chamber pressure becomes excessive. Thus, it is assured that the latch elements are decoupled when there is a relative pressure differential between the drive chamber and the counterpressure chamber and emergency shutdown is thereby facilitated.

BRIEF DESCRIPTION OF THE INVENTION

FIG. 3 shows the chronological sequence of pressures developed within the hydraulic drive system of FIG. 2.

DESCRIPTION OF THE PREFERRED EMBODIMENT

Figure 1:
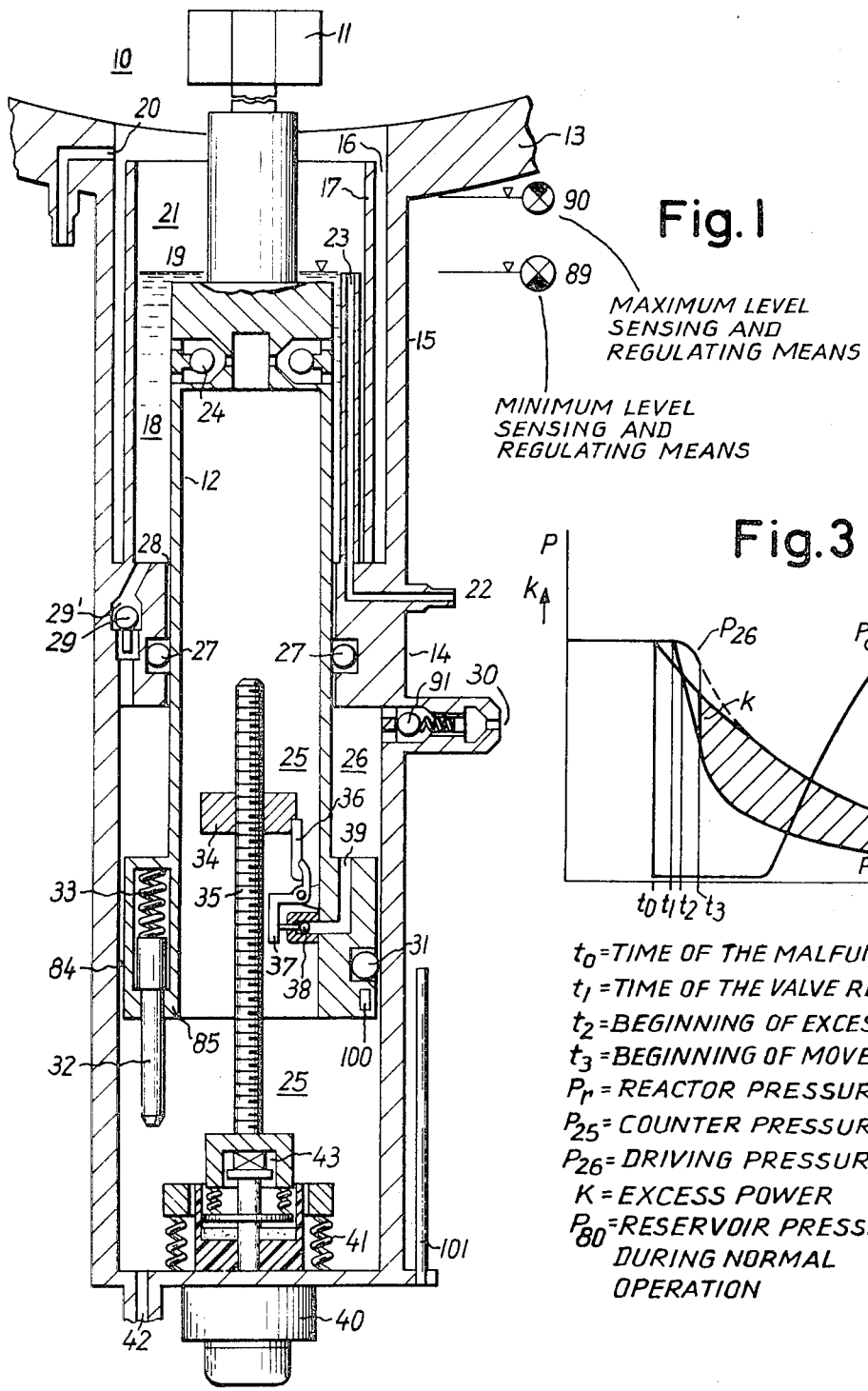
FIG. 1 is a cross-sectional view of one embodiment of a portion of the present invention.

Referring to FIG. 1, there is shown a reactor pressure vessel 13, which encloses a pressure medium or coolant chamber 10. A neutron-absorbing portion 11 is disposed in said reactor pressure vessel 13 and, during normal operation of the reactor, is driven by a drive motor 40 via the drive piston 12. The drive motor 40 and drive piston 12 are parts of a means for making fine adjustments in the position of the neutron-absorbing portion 11. The drive motor 40 turns a threaded spindle 35 on which a spindle nut 34 is disposed for longitudinal but not rotational movement. The spindle nut 34 is connected to the drive piston 12 via latching elements so that a turn to the right of the threaded spindle 35, for example, causes the neutron-absorbing portion 11 to be displaced upwardly with reference to FIG. 1. During fine adjustment, when the neutron-absorbing portion 11 is moved longitudinally into or out of the reactor core (not shown) relatively slow setting speeds of, for example, a few cm./sec. are sufficient. During an emergency shutdown, however, it is required that the neutron-absorbing portion 11 be moved very rapidly into the reactor core (not shown) at least initially during such movement. This is necessary in order that excessive reaction within the reactor core can be damped in time. Depending on the triggering event (i.e., depending on the type of reactor malfunction) there is only a limited amount of time available within which the neutron-absorbing portion 11 must stop the increased reaction. In a pressure medium (coolant) loss malfunction of a steam-cooled fast nuclear reactor, the time available for taking action is very short indeed. Hence, the time required to build up the necessary pressure to drive the piston 12 from a special shutdown tank via pipelines provided therefor is too long. Therefore, an arrangement must be provided which will make the drive pressure available immediately at the moment of the malfunction.

In FIG. 1, an approximately cylindrically constructed guide housing 14 is permanently connected to the reactor pressure vessel 13. The housing 14 is disposed outside the reactor pressure vessel 13 and serves to guide the hollow drive piston 12. The guiding is accomplished, for example, by an upper roller bearing 27 and a lower roller bearing 31. The interior of drive piston 12 holds part of the threaded spindle 35 and the spindle nut 34 disposed thereon. The end portion 85 of the hollow piston 12 together with the interior of the guide housing 14 form pressure chambers 25 and 26, respectively. As shown, a counterpressure chamber 25 is formed on one side of end portion 85 and drive chamber 26 is formed on the other side thereof. The drive chamber 26 and counterpressure chamber 25 communicate with each other via a conduit or gap 84 between end portion 85 and guide housing 14. The drive chamber 26 also communicates with the coolant chamber 10 via a conduit or gap 28 between guide housing 14 and the drive piston 12 so that pressure equalization is accomplished between chamber 10, 26 and 25.

If water is used as the pressure medium, as, for example, where light-water-moderated and cooled reactors and steam-cooled fast reactors are involved, it is possible, to provide the drive with conduit connections between the reactor and drive chambers. The pressure medium flows through such conduit connections and chambers to serve as a coolant and act to dissipate the hear generated therein. Thus, the pressure medium acts against the occurrence of detrimental thermal stresses. During emergency shutdowns, should the counterpressure chamber 25 suddenly be opened to the atmosphere, the pressure of the pressure medium within the drive chamber 26, cannot equalize very quickly through gap 84. Therefore, the pressure medium in drive chamber 26 serves to drive the piston 12. The piston 12 in turn pushes the neutron-absorbing portion 11 downwardly with respect to FIG. 1 into the reactor core (not shown). A downward movement with respect to FIG. 1 of the drive piston 12, however, can only occur when additional pressure medium is provided in the drive chamber 26. The gap 28 is not suited for this purpose, since it is constructed to be narrow enough to prevent the pressure in drive chamber 26 from being reduced thereby in the direction of the coolant chamber 10. Therefore, drive chamber 26 is connected to a collector chamber 18 via a conduit 29' and a relief valve 29 disposed therein in such a manner that pressure medium flows into the drive chamber 26 when the counterpressure chamber 25 is opened to atmospheric pressure in the case of an emergency shutdown.

The collector chamber 18 ensures that only liquid or steam-free pressure medium (coolant) flows into the drive chamber 26, since gas or steam components would only hinder the driving movement due to their compressibility. The collector chamber 18 is formed between the drive piston 12 and the outer wall 15 of the guide housing 14 near the coolant chamber 10. Inside the guide housing 14 there is a shielding cylinder 17 which forms a heat-insulation chamber 16 with the outer wall 15. Hence thermal stresses caused by the coolant in collector chamber 18 will not occur in the outer wall 15 and the temperature of the coolant is reduced in the direction away from the coolant chamber 10. In the present case, the drive system is constructed to be used with a steam-cooled nuclear reactor where the pressure medium is water. Near the end of the guide housing 14, in a direction toward the coolant chamber 10, a connection 20 is provided which connects the coolant chamber 10 to a drainage pump (not shown in FIG. 1). Water is continuously fed into collector chamber 18 via collector chamber feed pipe 22, so that the water level 19 is always determined by the collector chamber feed pipe 23. Thus, in the portion of the guide housing 14 nearest the coolant chamber 10, the conversion of the pressure medium in the form of water to coolant in the form of steam is accomplished.

Above the water level 19 there is a steam-water mixture chamber 21 which is characterized by the fact that the drainage pump always pumps, via the drainage pump connection 20, to such an extent that a separating zone is created in the direction toward the coolant chamber 10. The quantities of pressure medium turned over through chamber 18, 26, and 25 are so small that only a slight pressure reduction results from one chamber to the next.

It is also possible to conduct the pressure medium into the drive chamber 26 under high pressure through the drive chamber feed pipe 30 without having to open the counterpressure chamber 25 to the atmosphere. In this case, care must be taken that the pressure medium present in the counterpressure chamber 25 can escape. For this purpose piston check or one-way valves 24 are disposed in the upper portion of the drive piston 12, which check valves 24 connect the counterpressure chamber 25 with the collector chamber 18 when the pressure in the counterpressure chamber 25 increases. In a steam-cooled reactor care must be taken that the piston check valves 24 are always disposed below the water level 19. Otherwise steam could flow into the interior of the drive. Prerequisite for a movement of the drive piston 12 away from the coolant chamber 10, and thereby the neutron-absorbing portion 11 into the reactor core (not shown), is always that the latching mechanism of the setting drive or means for making fine adjustments in the position of the neutron-absorbing portion 11 be released. The latching occurs, according to FIG. 1, via a latch, extension 36 from the spindle nut 34, which is engaged or coupled by one of the arms of a rocking lever 37 fastened to drive piston 12. The lever 37 is pivotally mounted so that it can be released from engagement with the latch extension 36 by a ram or piston 38. The ram 38, as shown, engages the other end of the rocking lever 37. The piston 38 is provided with a ram line 39 in communication with the drive chamber 26 so that, when the pressure in drive chamber 26 increases, or when the pressure in chamber 25 suddenly decreases, the piston 38 is pushed against the rocking lever 31 and the latch 36 is released. Since the ram 38 is always directly charged by the pressure within the drive chamber 26, the release of the latch 36 occurs very quickly.

The movement of the drive piston 12, together with the neutron-absorbing portion 11, away from coolant chamber 10, must be slowed down and stopped near the end of the shutdown movement, in order to avoid having the neutron-absorbing portion 11 move too far and, thereby, destroy the drive. A closing element 32 is provided in the hollow piston end portion 85 for this purpose. The closing element 32 shuts off the counterpressure chamber feed tube 42, after the piston 12 has been moved a certain distance away from the coolant chamber 10 during the shutdown movement. Shock absorption for the locking element 32 is provided by way of a closing element spring 33. Hydraulic damping is accomplished to the extent that the damping spring 41 takes over the remaining damping of the shutdown movement. A prerequisite for the orderly functioning of the hydraulic brake is that the pressure in the counterpressure chamber 25 must not be released through the check valve 24 when the hydraulic brake is to take effect. The dimensions of the check valve 24 must, therefore, be such that the opened valve will be closed in time, for example, by a portion of the guide housing 14 at conduit 28. If the emergency shutdown does not occur by opening the counter-pressure chamber 25 to the atmosphere, but rather by an increase in pressure on the drive chamber 26, a hydraulic braking of the drive piston 12 can be realized by providing that the open check valve 24 will be closed before the shutdown movement is completed.

In FIG. 1, a separating switch 43 is provided which indicates that the latch between the setting or fine adjustment drive and the drive piston 12 has been released. Moreover a continuous control rod position indicator is provided. It is also possible to directly indicate the position of the control rod by the drive piston 12. This can be accomplished, for example, with the aid of a permanent magnet which acts on a switching relay disposed in a linkage or on an inductive receiver (not shown).

Figure 2:
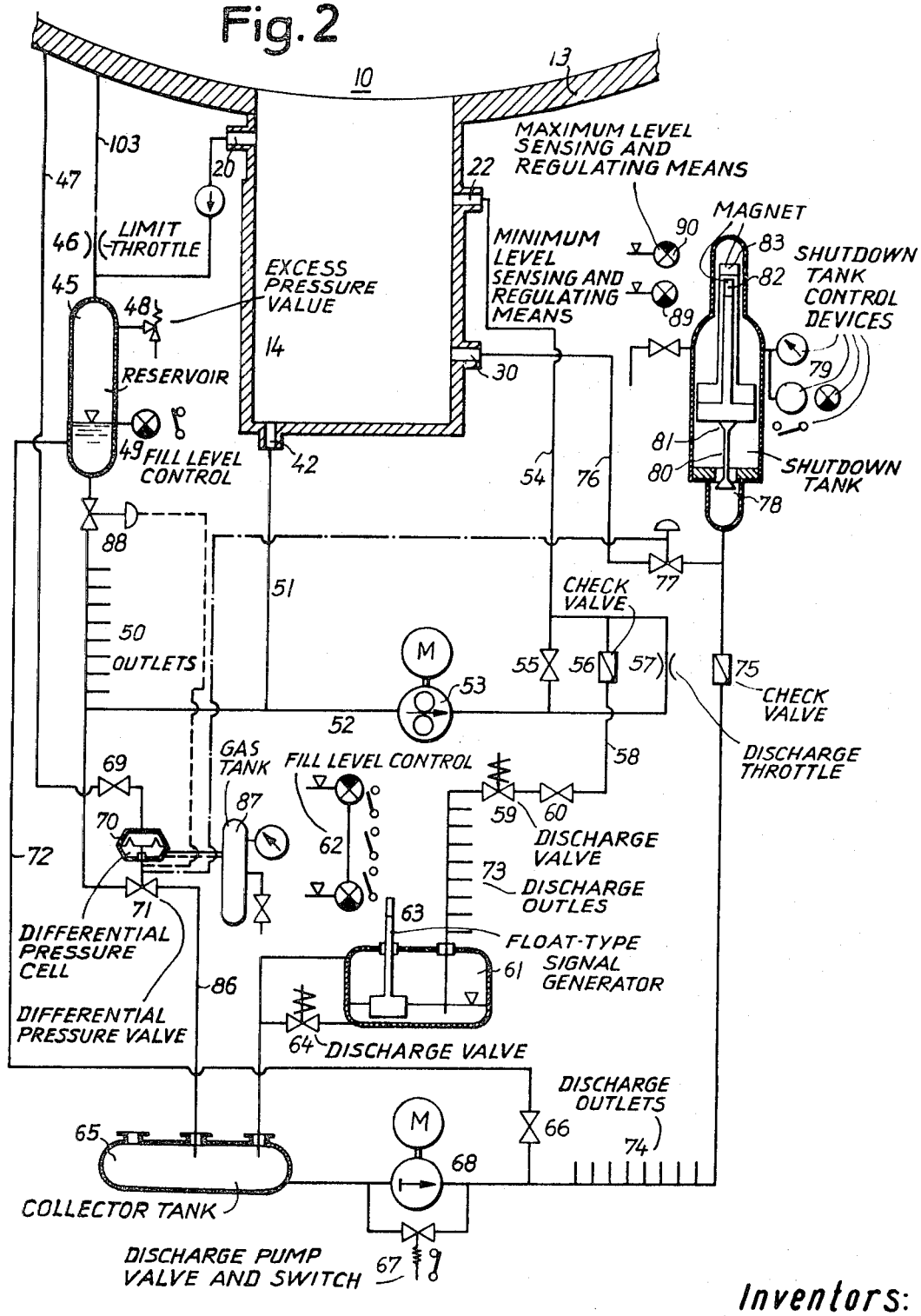
FIG. 2 is a schematic illustration of the hydraulic drive system of the present invention.

Referring to FIG. 2, this is a schematic illustration of the drive system of the present invention with coolant chamber 10, the reactor pressure vessel 13 and the guide housing 14 including the drainage pump connection 20, collector chamber feed pipe 22, drive chamber feed pipe 30 and the counterpressure chamber feed tube 42. The pressure medium is fed into collector chamber 18 by the pressure medium pump 53, which is, for example, a cog wheel pump, via the counterpressure chamber outlet line 51, the pressure medium pump feed line 52, and the check valve 56, the collector chamber feed line 54, and the collector chamber feed pipe 22.

During emergency shutdown, the counterpressure chamber 25 is opened to the atmosphere by differential pressure valve 71 disposed in the line 86, which opens to the atmosphere, in the direction toward the collector tank 65. The differential pressure valve 71 is charged by a differential pressure cell 70. The line 86 has an appropriately dimensioned cross section which facilitates the quick release of pressure to the atmosphere. One half of the differential pressure cell 70 is charged by the gas tank 87, the other half of the cell is controlled, via the measuring line 47 and the measuring line closing valve 69, directly by the pressure of the pressure medium in the chamber 10. If the pressure of the pressure medium varies by a certain adjustable value, or, if the change in pressure of the pressure medium exceeds a certain value, the differential pressure valve 71 is opened. The counterpressure chamber 25, as well as all other counterpressure chambers connected to the drives represented by the pressure medium outlets 50, is thereby opened to the atmosphere so that the emergency shutdown takes place. Care must be taken that the pressure medium reservoir valve 88 will be closed at least simultaneously to the opening of the pressure medium outlet 50, so that the replenishing process of the pressure medium reservoir 45 does not put an additional burden on the cross section of the line 103.

Because of the pressure medium leakage losses at the sealed parts between the setting or fine adjustment drive means and the guide housing 14 and, in steam-cooled reactors, because of the steam losses in the collector chamber 18, it is necessary to replenish the pressure medium in the system from the pressure medium reservoir 45. There is always a sufficient supply of pressure medium in reservoir 45. This is due to a fill level control 49 which is provided to control the supply in the reservoir 45 and maintain it at a minimum fill level. The pressure medium reservoir 45 is advantageously connected to the coolant chamber 10 and can receive the pressure medium therefrom. The limit throttle 46 takes care that the pressure in the pressure medium reservoir 45 remains substantially independent of sudden fluctuations in the pressure of the pressure medium. The pressure medium is a condensate from the pressure medium chamber 10 in the case of steam-cooled reactors. It is also possible to pump, by means of drainage pump 44, the steam-water mixture through the drainage pump connection 20 into the pressure medium reservoir 45. If the amount of pressure medium furnished in this way is not sufficient, more pressure medium can be fed in from the collector tank 65 through the discharge pump 68 via the fill valve 66 and the fill line 72. The discharge pump 68 is controlled, for example, by a discharge pump valve. In order to keep the pressure in the pressure medium reservoir 45 from becoming excessive due, for example, to operation of the drainage pump 44, there is provided an excess pressure valve 48.

Safe shutdown in steam-cooled reactors is always dependent on whether or not sufficient water is available in the collector chamber 18. For this purpose, a minimum level sensing and regulating means 89 is disposed at a point approximately at the level of the end of collector chamber feed pipe 23 toward coolant chamber 10. The means 89 provides an immediate indication of whether the water level 19 has fallen below the required level. The sensing means may, for example, include an irradiation device which operates on the basis that water, steam, and steam-water mixtures each absorb different amounts of radiation.

On the other hand, the water level 19 must not rise above a predetermined height. For instance, if a sudden replenishment of water occurs during emergency shutdown then water will flow from the counterpressure chamber 25 into the collector chamber 18 in a larger quantity than flows from the collector chamber 18 into the drive chamber 26. A maximum level sensing and regulating means 90 is therefore provided which controls a discharge valve 59 in such a manner that this valve releases the discharge line 58 to the collector measuring vessel 61. The water then flows from the collector chamber 18 into the collector measuring vessel 61. The discharge throttle 57 ensures that water will flow from the coolant chamber 10 only at a certain speed under full pressure of the pressure medium. In order to also be able to discharge pressure medium under low pressure, a valve 55 is provided parallel to the discharge valve 57. The valve 55 can open the entire cross section of the collector chamber feed line 54. Otherwise, due to the slight manometric incline, the water would not flow at a sufficient speed through the discharge throttle 57. The discharge line 58 can be blocked by a discharge blocking valve 60. All the discharge valve outlets 73 are connected to the collector measuring vessel 61. A floating signal generator 63 cooperates with a fill level control 62 so that when a certain fill level is exceeded in collector measuring vessel 61, the collector measuring vessel discharge valve 64 is opened toward the collector tank 65 until a minimum fill level has been reached by discharge of water. In order to realize an emergency shutdown which is independent of the differential pressure valve 71, a shutdown tank 80 containing pressure medium is connected to the drive chamber 26 via a shutdown valve 77, a shutdown line 76 and the drive chamber feed pipe 30. In the drive chamber feed pipe 30 a feed pipe check valve 91 is disposed which prevents a reduction in pressure of the pressure medium in the event the shutdown line 76 is ruptured. In the shutdown tank 80 which is filled with pressure medium, water under gas pressure, there are two superposed floats, each one being independently freely movable. These floats bear magnets 82, 83 at their ends to indicate the water level. Below the lower float there is a cone-shaped valve 81 which is sealingly seated on a valve seat to prevent gas from getting into the drive. A cone-shaped valve 78 acts in a similar manner in the opposite direction. The valve 78 ensures that, during filling of the shutdown tank 80, the filling is stopped once a certain volume has been reached. Filling of the shutdown tank 80 occurs by means of the discharge pump 68 via the fill check valve 75. The discharge pump 68 is controlled by the discharge pump valve 67 in such a manner that the pump is disconnected when the entire conveyed volume goes through the discharge pump valve 67. When this occurs, no more water can be filled into any of the shutdown tanks which are connected in parallel with each other via the fill line outputs 74. Control devices 79 control the gas pressure and the gas level of the shutdown tanks 80.

During emergency shutdown the shutdown valve 77 is opened so that the shutdown tank 80 can feed pressure medium into the drive chamber 26, under extra pressure. The fill check valve 75 here prevents accidental discharge of the pressure medium. It is preferable to also control the shutdown valve 77 by the differential pressure cell 70. This type of control of the shutdown valve 77, which is indicated by the broken lines shown, makes possible an additional drive of the drive piston 12 by filling the shutdown tank 80.

Referring to FIG. 3, this shows chronologically the occurrence of pressures in the drive or in the reactor, respectively, as seen qualitatively. The symbols used are as follows:

$t_0$ = time of the malfunction;
$t_1$ = time of the valve reaction;
$t_2$ = beginning of excess power;

$t_3$ = beginning of movement;
$P_r$ = reactor pressure
$P_{25}$ = counterpressure
$P_{26}$ = driving pressure
$K$ = excess power
$P_{80}$ = reservoir pressure A requirement of the present invention is that, during normal operation, there be no differences in pressure between coolant chamber 10, drive chamber 26 and counterpressure chamber 25.

From time $t_0$ of the malfunction on, the pressure $P_r$ of the pressure medium in the reactor will fall. The amount to which such pressure is reduced is determined by the type of malfunction which causes the loss of pressure medium. In the present example let it be assumed that the reactor is a steam-cooled fast reactor of which the pressure vessel cannot be ruptured. The pressure medium in the form of steam is discharged through a plurality of parallel-connected lines. The malfunction, which results in the pressure medium loss, occurs in the form of a break in one of these lines. When this break happens, a finite loss in pressure takes place. Up to time $t_1$, which is the time at which the differential valve 71 responds by opening, the pressure in the counterpressure chamber 25 is fully effective. Beginning with time $t_1$, the pressure in the counterpressure chamber 25 begins to fall. In this regard, the feed lines into the counterpressure chamber 25 must be so dimensioned that the pressure therein falls faster than the pressure in the reactor due to the above-described malfunction. From time $t_2$ on, the time at which excess power from the reactor coolant chamber 10 starts acting on the drive piston 12, the movement of drive piston 12 away from the coolant chamber 10 can occur. It is here assumed that the beginning of the movement of drive piston 12 occurs at $t_3$. In other words, sufficient excess power $K$ is required to overcome the force of the valve 29 and the frictional forces of the drive piston 12 against the guide housing 14. Such excess power $K$ can not be furnished by the pressure stored only in the drive chamber 26. Until the time when the valve 29 is closed, the driving pressure $P_{26}$ in drive chamber 26 falls only slightly due to the relatively small size of conduit 28. From $t_3$ on, however, $P_{26}$ will fall very rapidly to the pressure $P_r$ of the pressure medium in the reactor.

It can be seen that the pressure of the reactor pressure medium is used for the emergency shutdown so that the shutdown tank 80 can be eliminated. For reasons of safety, however, it is possible to increase the shutdown effect with the aid of reactor pressure which is fed into the drive chamber 26. FIG. 3 shows this graphically in the form of the reservoir pressure $P_{80}$. The increase in the reservoir pressure must be expected to occur relatively late, since the pressure in the shutdown line 76 must first be built up. The dead time required for the pressure buildup can advantageously be kept short, as already described and indicated by broken lines in FIG. 2, by providing that the shutdown valve 77 is also controlled, as is the differential pressure valve 71, by the differential pressure cell 70.

It will be understood that the above description of the present application is susceptible to various modifications, changes and adaptations.

We claim:

1. Hydraulic drive system for effecting the emergency shutdown by control rods of a nuclear reactor having a pressure medium chamber in a reactor pressure vessel comprising, in combination:
   a. a guide housing connected to said pressure vessel;
   b. a drive piston mounted for movement in said guide housing, said drive piston and guide housing forming (1) a drive chamber on the pressure vessel side, (2) a counterpressure chamber on the opposite side of said drive piston, and (3) a connecting gap between said drive and counterpressure chambers;
   c. a neutron-absorbing portion of such control rods connected to said drive piston;
   d. means connected to the drive piston for making fine adjustments in the position of said neutron-absorbing portion;
   e. means for opening said counterpressure chamber to atmosphere during emergency shutdowns;
   f. a first conduit connecting said pressure medium chamber to said drive chamber; and
   g. a relief valve disposed in said first conduit which opens the same during emergency shutdowns to allow pressure medium to flow successively from said pressure medium chamber into said drive and counterpressure chambers when said counterpressure chamber is opened to atmosphere, as a consequence of which said drive piston and thereby said neutron-absorbing portion are moved rapidly into an emergency shutdown position.

2. Hydraulic drive system as defined in claim 1 wherein said means (e) includes a pressure-medium-controlled differential valve connected to said counterpressure chamber for opening the same to atmospheric pressure during emergency shutdowns.

3. Hydraulic drive system as defined in claim 2 further comprising a shutdown tank connected to said drive chamber and charged with pressure medium.

4. Hydraulic drive system as defined in claim 3 wherein said shutdown tank is connected to said drive chamber via a connecting line and said differential valve is connected to said connecting line to open the same during emergency shutdowns.

5. Hydraulic drive system as defined in claim 1 wherein a collector chamber is defined between said guide housing and said drive piston, said collector chamber being disposed beyond said drive chamber toward said reactor pressure vessel and being connected to the pressure medium chamber thereof, and said first conduit being connected to said pressure medium chamber via said collector chamber; and a cylindrical heat protection wall is located between said collector chamber and said guide housing, said heat protection wall being spaced from said guide housing to define a heat protection chamber therebetween which is filled with a pressure medium as a coolant.

6. Hydraulic drive system as defined in claim 5, further comprising means for feeding pressure medium taken from said counterpressure chamber into said collector chamber and wherein a second conduit connecting said collector chamber to said drive chamber is formed between said drive piston and guide housing, whereby pressure medium from said collector chamber flows into said drive chamber.

7. Hydraulic drive system as defined in claim 5 wherein said drive piston is hollow, the interior of said piston forming part of said counterpressure chamber and said drive piston being provided near its end toward said pressure medium chamber with a relief valve which connects said counterpressure chamber with said collector chamber when the drive chamber is charged with pressure from said shutdown tank.

8. Hydraulic drive system as defined in claim 7 wherein said piston relief valve includes an opening which is so arranged and dimensioned with respect to said guide housing that it is closed before completion of the emergency shutdown movement of said drive piston.

9. Hydraulic drive system as defined in claim 7 wherein the pressure medium is in the form of water which is fed into the collector chamber to a level which is always located above said piston relief valve.

10. Hydraulic drive system as defined in claim 9 wherein an opening for draining pressure medium from said collector chamber is provided near the end of said guide housing in the direction toward said pressure medium chamber.

11. Hydraulic drive system as defined in claim 1 wherein said drive piston is connected to said fine adjustment means via latch elements coupled to each other and further comprising means for decoupling said latch elements when there is excess pressure in said drive chamber, said decoupling means being operated by the pressure in said drive chamber.

12. Hydraulic drive system as defined in claim 11 wherein one of said latch elements is a pivotal lever one end of which is coupled to another latch element, and said decoupling means includes a piston disposed in said drive piston and having one end engaging the other end of said pivotal lever and its other end in communication with said drive chamber, as a consequence of which said decoupling piston is charged by pressures in said drive chamber to decouple said pivotal lever from the other latch member; hence said fine adjustment means from said drive piston.

13. Hydraulic drive system as defined in claim 1 wherein a closing element is provided on said drive piston and in said counterpressure chamber, said means (e) including a tube leading from said counterpressure chamber and said closing element being aligned with said tube for closing the same after said drive piston has been moved a certain distance during the emergency shutdown.

14. Hydraulic drive system as defined in claim 13, further comprising a pressure medium reservoir connected to said pressure medium chamber and pressurized thereby; and wherein a pump is connected to said counterpressure chamber via said tube for taking pressure medium therefrom, said pump being also connected to said pressure medium reservoir.

15. Hydraulic drive system as defined in claim 14, further comprising a drainage pump connected between said collector chamber and said pressure medium reservoir, said drainage pump feeding pressure medium from the collector chamber into the pressure medium reservoir.

* * * * *